United States Patent
Browne

(10) Patent No.: US 10,576,800 B2
(45) Date of Patent: Mar. 3, 2020

(54) MIDDLE HOOP SYSTEM FOR A MULTI-UNIT VEHICLE

(71) Applicant: ATG Autotechnik GmbH, Siek (DE)

(72) Inventor: Denis Browne, Trittau (DE)

(73) Assignee: ATG Autotechnik GmbH, Siek (DE)

( * ) Notice: Subject to any disclaimer, the term of this patent is extended or adjusted under 35 U.S.C. 154(b) by 110 days.

(21) Appl. No.: 15/883,122

(22) Filed: Jan. 30, 2018

(65) Prior Publication Data
US 2018/0215219 A1 Aug. 2, 2018

(30) Foreign Application Priority Data
Jan. 30, 2017 (EP) ..................................... 17153666

(51) Int. Cl.
*B60D 5/00* (2006.01)
*B62D 47/02* (2006.01)

(52) U.S. Cl.
CPC ............... *B60D 5/006* (2013.01); *B60D 5/00* (2013.01); *B62D 47/025* (2013.01)

(58) Field of Classification Search
CPC ......... B60D 5/003; B60D 5/00; B62D 47/025
USPC ....................................................... 280/403
See application file for complete search history.

(56) References Cited

U.S. PATENT DOCUMENTS

| | | | |
|---|---|---|---|
| 6,076,470 A * | 6/2000 | Koch ................. | B60D 5/006 105/14 |
| 8,523,215 B2 | 9/2013 | Browne | |
| 2007/0007795 A1 * | 1/2007 | Koch ................. | B60D 5/003 296/178 |
| 2010/0283223 A1 * | 11/2010 | Browne ................. | B60D 5/00 280/403 |
| 2011/0272915 A1 * | 11/2011 | Browne ................. | B60D 1/62 280/403 |
| 2013/0049325 A1 * | 2/2013 | Mosaner ................. | B60D 5/00 280/403 |
| 2017/0240012 A1 * | 8/2017 | Browne ................. | B60D 1/64 |

FOREIGN PATENT DOCUMENTS

| | | | |
|---|---|---|---|
| DE | 102010011903 A1 | 11/2011 | |
| DE | 102010011903 B4 * | 5/2014 | ............... B60D 1/62 |
| FR | 2443940 A1 * | 7/1980 | ............. B60D 5/003 |

OTHER PUBLICATIONS

European Search Report dated Jul. 12, 2017 (European Patent Application No. 17153666.7).

* cited by examiner

*Primary Examiner* — Jacob D Knutson
(74) *Attorney, Agent, or Firm* — Alix, Yale & Ristas, LLP

(57) ABSTRACT

The disclosure relates to a middle hoop system for a vehicle joint arranged between a first vehicle section and a second vehicle section of a multi-unit vehicle. The middle hoop system comprises a middle hoop, which is oriented in a transverse direction, and a cable strand which extends between sections of the vehicle. The middle hoop surrounds a passage intended for passengers. The cable strand is arranged above the passage. The middle hoop system comprises a guide lever which is connected to the middle hoop by means of a first pivot joint and which is connected to the cable strand by means of a second pivot joint, the axis of the first pivot joint and the axis of the second pivot joint intersecting a vertical longitudinal plane. The middle hoop system according to the invention can be produced inexpensively and offers reliable guidance for the cable strand.

14 Claims, 3 Drawing Sheets

MIDDLE HOOP SYSTEM FOR A MULTI-UNIT VEHICLE

BACKGROUND

The invention relates to a middle hoop system for a vehicle joint arranged between a first vehicle section and a second vehicle section of a multi-unit vehicle. The middle hoop system comprises a middle hoop, which is oriented in a transverse direction, and a cable strand which extends between the first vehicle section and the second vehicle section. The middle hoop surrounds a passage intended for passengers. The cable strand is arranged above the passage.

Such middle hoop systems may be used for example in articulated buses or in other types of road-going or rail-bound multi-unit vehicles. In such vehicles, passengers can move between the vehicle sections during travel. To protect the passengers against environmental influences, the transition between the vehicle sections is normally equipped with a corrugated bellows which surrounds the vehicle joint.

There are technical functions which relate to multiple vehicle sections of a multi-unit vehicle. For example, a driver seated at the front may actuate a light switch in order to operate a rear light at the rear end of the vehicle. For this purpose, an electrical cable is required which extends across the intermediate space between the vehicle sections. Further functions require hydraulic lines, air hoses and other supply lines between the vehicle sections.

In low-floor vehicles, in which the floor intended for the passengers is arranged as low as possible, only little space remains below the passage. More space is available above the passage, for which reason the cables are commonly led there.

To prevent the cables striking the middle hoop when traveling over ground undulations or in the presence of unevenness, guidance of the cables relative to the middle hoop is necessary. The known systems (EP 0 897 337 A1, EP 2 384 913 A1) are complex and cumbersome to produce.

SUMMARY

The invention is based on the object of proposing an inexpensive middle hoop system in the case of which the cable strand is guided reliably. Proceeding from the stated prior art, the object is achieved by means of the features of claim 1. Advantageous embodiments are specified in the subclaims.

According to the invention, the middle hoop system comprises a guide lever which is connected to the middle hoop by means of a first pivot joint and which is connected to the cable strand by means of a second pivot joint. The pivot axis of the first pivot joint and the pivot axis of the second pivot joint intersect a vertical longitudinal plane. By means of such a guide lever, it is possible firstly to ensure defined guidance for the cable strand, while secondly, the required freedom of movement between the cable strand and the middle hoop is maintained.

In the context of the present invention, cables serve for linking technical functions of the vehicle sections of the multi-unit vehicle to one another. The expression "cable" encompasses all supply lines via which signals or forces are transmitted between the vehicle sections. The expression "cable" encompasses in particular electrical cables, glass-fiber lines, hydraulic lines, air hoses for air-conditioning and heating systems. In the case of the middle hoop system according to the invention, a cable strand composed of a multiplicity of such cables extends across the intermediate space between the two vehicle sections adjoining the vehicle joint.

The two vehicle sections may be a front vehicle section and a rear vehicle section of a two-unit vehicle, for example of an articulated bus. It is also possible for more than one vehicle section to be arranged in one or both longitudinal directions proceeding from the vehicle joint. The longitudinal direction encloses a right angle with the middle hoop. A vertical longitudinal plane is a vertical plane which extends in the longitudinal direction.

The movements that take place between the first vehicle section and the second vehicle section during the operation of the multi-unit vehicle are complex. They include rotation, pitching, rolling and combinations of these. The movements performed here by the cable strand and the middle hoop in the intermediate space between the front vehicle section and the rear vehicle section are not always synchronous.

The guide lever according to the invention firstly permits the required freedom of movement between the cable strand and the middle hoop, whereas on the other hand, undesired movements are prevented. Undesired movements include inter alia those which cause the cable strand to strike the middle hoop. By contrast, it is desired for a limited degree of freedom of movement to exist between the cable strand and the middle hoop with regard to longitudinal movements. By virtue of the cable strand being guided by the guide lever, the middle hoop can move to a limited extent in the longitudinal direction without the cable strand being forced to perform a corresponding movement.

The axis of the first pivot joint (first pivot axis) may enclose an angle of at least 45°, preferably at least 70°, with the vertical longitudinal plane. In particular, the pivot axis of the first pivot joint may extend parallel to the middle hoop and in a horizontal direction. This corresponds to an orientation in the transverse direction, such that the vertical longitudinal plane is intersected at an angle of approximately 90°. A corresponding situation may apply to the orientation of the axis of the second pivot joint (second pivot axis). In particular, the first pivot axis and the second pivot axis may be oriented parallel to one another.

The pivoting movement of the guide lever may take place in the vertical longitudinal plane. The main direction of the guide lever may be oriented parallel to the vertical longitudinal plane. The middle hoop system according to the invention may be designed such that the guide lever is rigid with respect to forces from other directions, that is to say with respect to forces which are not converted into a pivoting movement of the guide lever. In this context, "rigid" means that, aside from the pivoting movements, there are no movements which cause the first pivot axis and the second pivot axis to be displaced relative to one another. Movements performed by the guide lever and the pivot axes jointly are not ruled out.

The first pivot joint, by means of which the guide lever is suspended on the middle hoop, may be arranged above the second pivot joint. The cable strand is then suspended on the guide lever, such that a stable state of the two pivot joints is set under the influence of gravitational force. The spacing between the first pivot axis and the second pivot axis may lie between 10 cm and 30 cm, preferably between 15 cm and 25 cm. The spacing of the pivot axes corresponds to the length of the guide lever.

The second pivot joint may be fastened to a support device of the cable strand. The support device may extend in a curved path along the cable strand. The curved path may be arranged in a horizontal plane. The support device may in particular comprise a leaf spring which extends parallel to the cable strand. A leaf spring refers to an elongate element which can be easily elastically deformed in a direction perpendicular to its longitudinal direction and can be elastically deformed with greater difficulty in another direction. To the leaf spring there may be attached bearing elements by means of which the cables are held in a defined position relative to the leaf spring. The bearing elements may have openings for the cables, such that the cables can be supported over their entire circumference by the bearing elements. It is possible for a multiplicity of bearing elements to be arranged in the same plane, in particular in the plane in which the curved path of the leaf spring extends. This may apply in particular to bearing elements arranged adjacent to the middle hoop. Bearing elements further remote from the middle hoop may be attached in a lower-lying position.

The guide lever may be attached to the cable strand centrally in relation to a transverse direction of the cable strand, such that the weight force exerted by the cable strand acts substantially in an elongation of the guide lever. In this way, the bearing forces in the pivot joints can be kept low. In a normal state of the vehicle, in which the vehicle sections of the multi-unit vehicle are standing straight and one behind the other in a plane, the second pivot axis may be arranged vertically below the first pivot axis.

A linear guide may be formed between the guide lever and the middle hoop and/or between the guide lever and the cable strand. The linear guide may define a rectilinear or slightly curving path, along which the guide lever can be moved relative to the respective element. The linear guide may extend in a transverse direction. The linear guide may be oriented horizontally. By means of such a linear guide, it is made possible for the cable strand to move also in the transverse direction relative to the middle hoop. Undesired stresses in the cable strand can thus be further reduced.

The linear guide may comprise a rod which is connected to the middle hoop and on which the guide lever is suspended. The axis of the first pivot joint may coincide with the axis of the rod. In particular, on the guide lever, there may be formed a receptacle which extends to both sides of the rod. The receptacle may have a guide surface which lies on the transverse rod and which, during a pivoting movement of the first pivot joint, slides on the surface of the rod. The rod may be oriented in a transverse direction. The rod may extend rectilinearly in a horizontal direction. The rod may, on its top side, have a rounded contour in cross section; in particular, the rod may be circular in cross section.

The linear guide may comprise a roller, such that the movement can take place with little expenditure of force. The roller can run on the rod on which the guide lever is suspended. The roller may be rotatably mounted in a receptacle of the guide lever. The surface of the roller may simultaneously form a guide surface of the pivot joint, which guide surface slides relative to another surface of the linear guide during a pivoting movement of the guide lever.

In particular, it is possible for the linear guide to be formed by the rod on which the guide lever is suspended. A roller arranged in the receptacle of the guide lever can roll on the rod during a movement corresponding to the linear guide. During a pivoting movement of the guide lever, the roller can perform a sliding movement about the axis of the rod.

In the case of multi-unit vehicles, the middle hoop may be guided such that it always assumes a central position between the two adjoining vehicle sections. The mounting according to the invention for the cable strand can be readily used with such a middle hoop. Also possible is use with middle hoops which are not fixed at a central position between the front vehicle section and the rear vehicle section during the operation of the articulated vehicle. For example, the middle hoop may be held with a fixed spacing or a fixed minimum spacing to the first vehicle section or to the second vehicle section by means of a control rod. The control rod may be articulated on the middle hoop and permit a rotation of the middle hoop about a vertical axis. If the middle hoop is held with a fixed spacing to one of the vehicle sections by means of such a control rod, pitching movements are compensated by means of a relative movement between the middle hoop and the other vehicle section.

Instead of a fully rigid control arm, it is also possible for a connection to be provided which is rigid with respect to pressure forces but which can be lengthened under the action of tensile forces. If the articulated vehicle travels over a crest and the spacing between the front vehicle section and the rear vehicle section thus increases in the upper region, the middle hoop can move away from the vehicle section to which the connection exists, and thereby contribute to bridging the spacing. The spacing between the middle hoop and the front vehicle section or rear vehicle section as defined by the control rod in the normal state is then simultaneously the minimum spacing. By contrast, the spacing can be increased by tensile force.

The invention also relates to a multi-unit vehicle in which a middle hoop system of said type is arranged between a first vehicle section and a second vehicle section. The first vehicle section and the second vehicle section are articulatedly connected to one another by means of a vehicle joint. The multi-unit vehicle may in particular be an articulated bus, in which the middle hoop system is arranged between a front vehicle section and a rear vehicle section.

BRIEF DESCRIPTION OF THE DRAWINGS

The invention will be described below with reference to the appended drawings and on the basis of advantageous embodiments. In the drawings.

DETAILED DESCRIPTION

Figure 1:
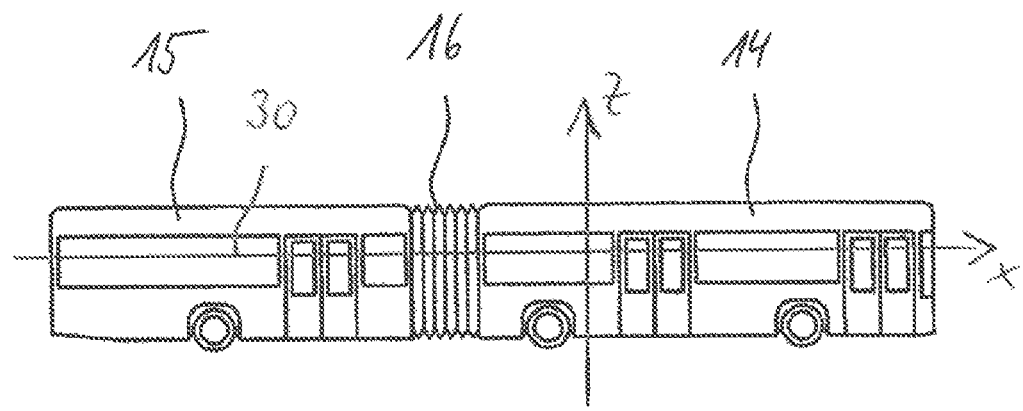
FIG. 1 shows a side view of an articulated vehicle.

An articulated bus shown in FIG. 1 comprises a front vehicle section 14 and a rear vehicle section 15. The front vehicle section 14 and the rear vehicle section 15 are connected to one another by means of a vehicle joint (not illustrated in FIG. 1), in such a way that passengers can move between the front vehicle section 14 and the rear vehicle section 15 through a passage 17 during travel. A corrugated bellows 16 surrounds the vehicle joint and the passage 17. The middle hoop system according to the invention is arranged in the intermediate space between the front vehicle section 14 and the rear vehicle section 15 and is concealed in FIG. 1 by the corrugated bellows 16. Line X represents a longitudinal direction of the articulated bus, and line Z represents a vertical direction perpendicular to the longitudinal direction X. A vertical longitudinal plane is a plane that is parallel to both the longitudinal direction X and the vertical direction Z. A transverse direction (across the articulated bus) is perpendicular to both the longitudinal direction X and the vertical direction Z.

Figure 2:
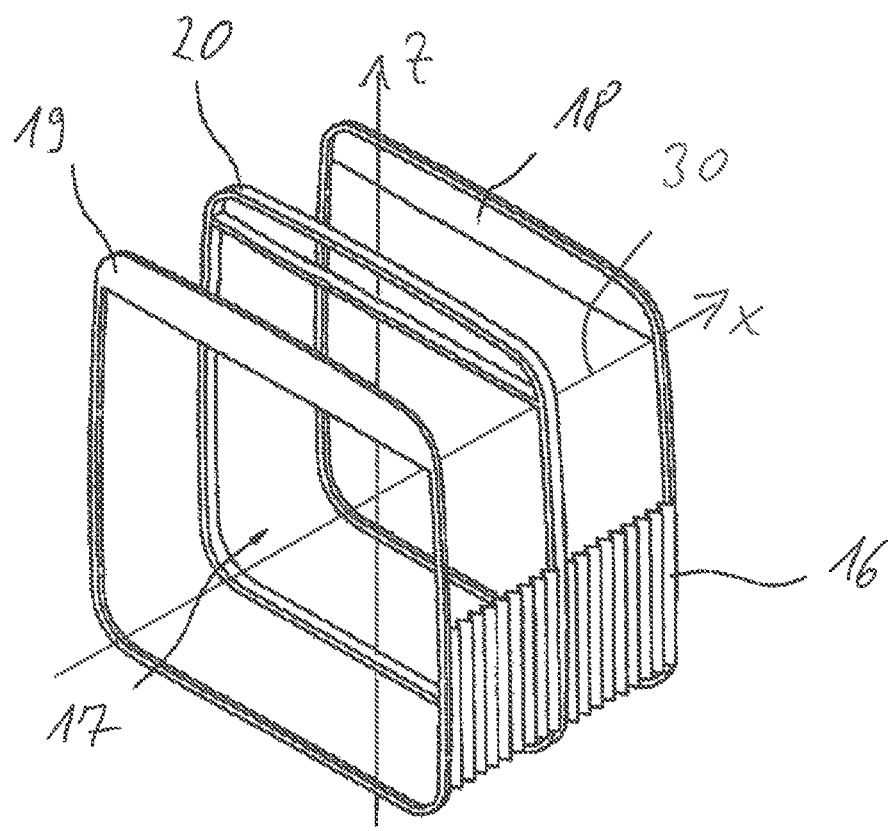
FIG. 2 shows a perspective view of a middle hoop system of the articulated vehicle from FIG. 1.

FIG. 2 shows the end frame 18 of the front vehicle section 14 and the end frame 19 of the rear vehicle section 15. The corrugated bellows 16 is shown only partially in FIG. 2. Between the end frame 18 and the end frame 19 there is arranged a middle hoop 20, which provides additional support for the corrugated bellows 16. When the front vehicle section 14 and the rear vehicle section 15 are aligned along the longitudinal direction X and on a flat level surface, end frames 18, 19 and middle hoop 20 are each oriented in a transverse plane perpendicular to the longitudinal direction X and parallel with vertical direction Z.

Figure 3:
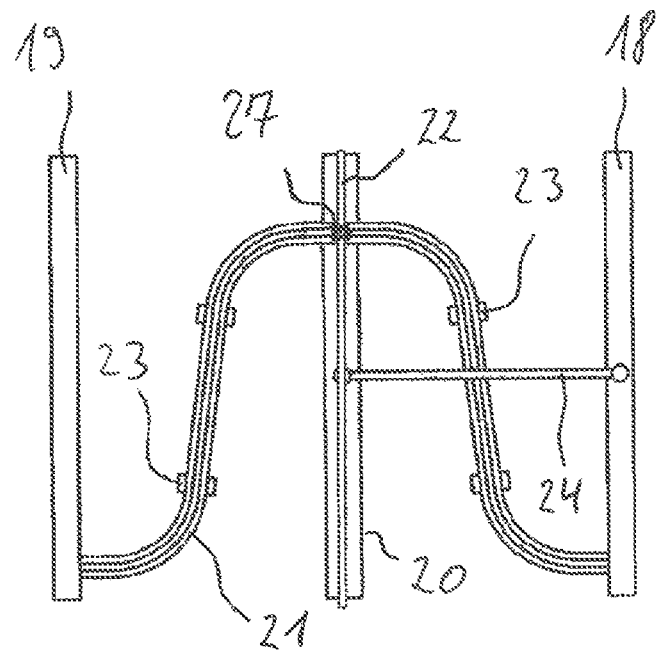
FIG. 3 shows a view from above of a middle hoop system according to the invention.

As per FIG. 3, a cable strand 21 extends between the end frame 18 and the end frame 19. The cables extend in the form of a unitary strand 21 through the intermediate space between the end frame 18 and the end frame 19. The cable strand 21 follows a curving path in the intermediate space between the front vehicle section 14 and the rear vehicle section 15, which path extends substantially in a horizontal plane parallel with longitudinal direction X and perpendicular to vertical direction Z. The cable strand 21 is thus capable of compensating movements that the front vehicle section 14 and the rear vehicle section 15 perform relative to one another.

Figure 4:
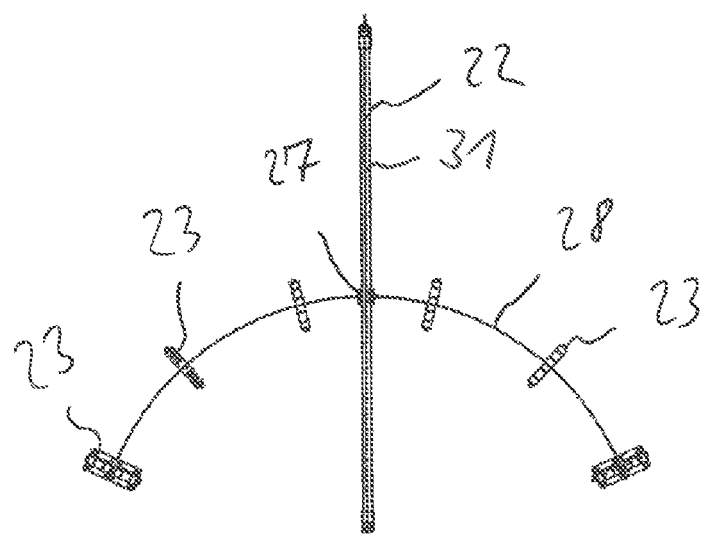
FIG. 4 shows a view from above of a cable guide of a middle hoop system according to the invention.
Figure 5:
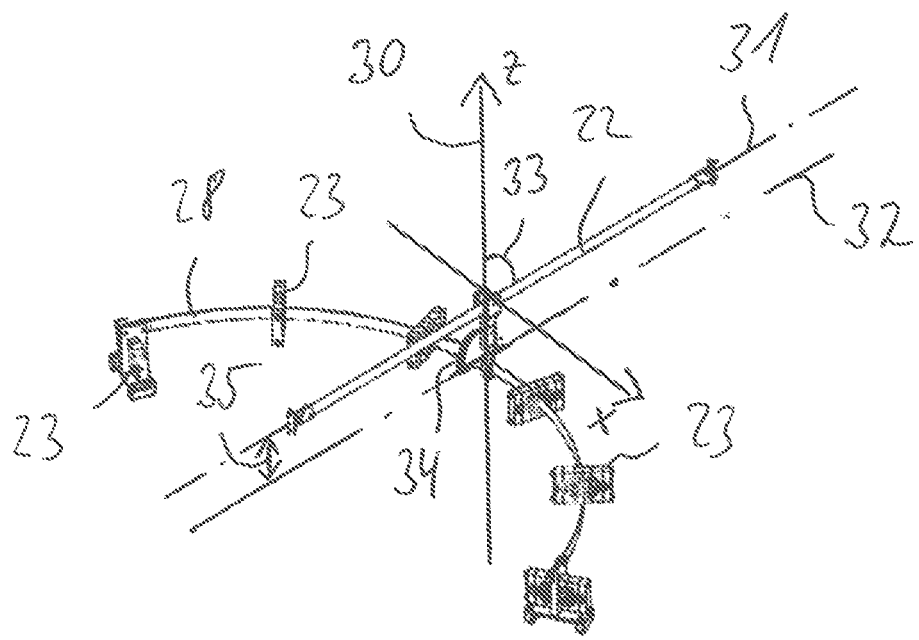
FIG. 5 shows the cable guide from FIG. 4 in a perspective illustration.
Figure 7:
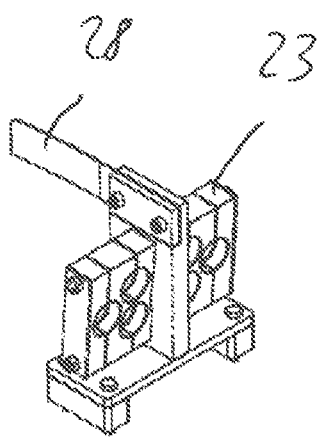
FIG. 7 shows another detail from FIG. 5 in an enlarged illustration.

FIGS. 4 and 5 illustrate the cable guide without cables. According to said figures, the cable guide comprises a leaf spring 28 which is arranged centrally between the cables and which extends parallel to the cable strand. On the leaf spring 28, which is connected to a transverse rod 20 of the middle hoop 20 in a manner discussed in more detail further below, there are suspended bearing elements 23. In the bearing elements 23 there are formed, as per FIG. 7, openings through which the cables of the cable strand 21 are led. In the exemplary illustration as per FIG. 7, in each case three cables are guided on both sides of the leaf spring 28. Of the total of six bearing elements 23 which are suspended on the leaf spring 28, the middle four are arranged at the same height as the leaf spring 28. The two outer bearing elements 23 hang slightly lower. Defined guidance of the cable strand 21 is realized by means of the leaf spring 28 and the bearing elements 23.

The middle hoop 20 is, as per FIG. 3, connected to the end frame 18 by means of a rigid control rod 24. Both between the control rod 24 and the end frame 18 and between the control rod 24 and the middle hoop 20, there is formed a joint which permits pivoting movement about a vertical joint axis. Thus, if the articulated bus travels around a corner and buckles in a lateral direction, the middle hoop 20 can perform the corresponding pivoting movement, such that it permanently assumes approximately a central position between the end frame 18 and the end frame 19. By contrast, if the articulated bus travels over a crest, the corresponding pitching movement is compensated only between the middle hoop 20 and the end frame 19. The spacing between the end frame 18 and the middle hoop 20 remains constant owing to the control rod 24. Thus, in the event of pitching movements, the middle hoop 20 is not in a central position between the end frame 18 and the end frame 19. A rigid connection between the middle hoop 20 would force the cable strand 21 to perform unnecessary movements in the longitudinal direction. According to the invention, it is therefore provided that the middle hoop 20 can move in the longitudinal direction relative to the cable strand 21, such that the cable strand 21 is not forced to perform every longitudinal movement of the middle hoop 20. The cable guide according to the invention, which permits this, will be discussed below.

The cable guide comprises a transverse rod 22 which is arranged above an upper frame part of the middle hoop 20. The transverse rod 22 extends in a transverse direction parallel to the middle hoop 20. Between the transverse rod 22 and the upper frame part of the middle hoop 20, there remains a free space through which the cable strand 21 is led.

The cable strand 21 is suspended on the transverse rod 22 by means of a guide lever 25. According to FIG. 6, the guide lever 25 comprises a receptacle 26 in which a roller 27 is rotatably mounted. The receptacle 26 comprises two limbs which enclose the transverse rod 22 between them. The roller 27, which is likewise enclosed between the limbs, runs on the top side of the transverse rod 22.

Figure 6:
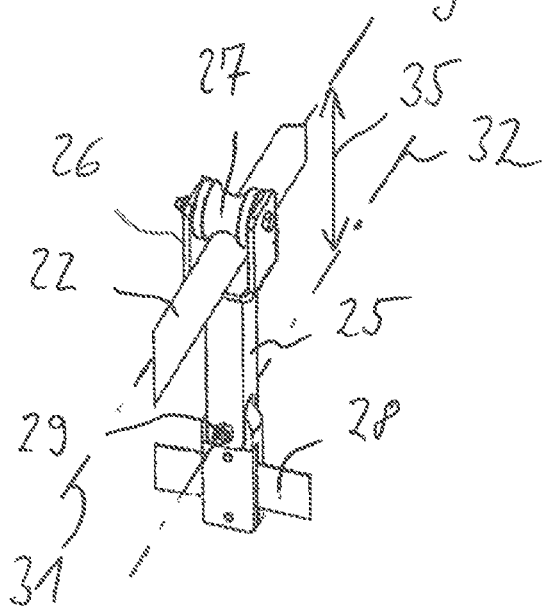
FIG. 6 shows a detail from FIG. 5 in an enlarged illustration.

The transverse rod 22 is of circular cross section, such that the guide lever 25 can be pivoted about the axis 31 of the transverse rod 22 as shown in FIGS. 5 and 6. During such a pivoting movement, the roller 27 slides in a circumferential direction on the surface of the transverse rod 22.

The lower end of the guide lever 25 is connected to the leaf spring 28, which is arranged in the center of the cable strand 21 and which extends parallel to the cable strand 21. Suspended on the leaf spring 28 are the bearing elements 23, in which the cables of the cable strand 21 are held.

Between the guide lever 25 and the leaf spring 28, there is formed a pivot joint 29, the axis 32 of which is oriented parallel to the transverse rod 22. As shown in FIGS. 5 and 6, the length of the guide lever 25 defines a spacing 25 between the axis 31 of the first pivot joint 22/27 and the axis 32 of the second pivot joint 29. The axes 31, 32 of the first and second pivot joints 22/27, 29 intersect a vertical longitudinal plane (parallel to longitudinal direction X and vertical direction Z) as shown in FIG. 5. An angle 33 enclosed between the axis 31 of the first pivot joint 22/27 and a vertical longitudinal plane is preferably at least 45°, more preferably at least 70° and most preferably 90°, as shown in FIG. 5. An angle 34 enclosed between the axis 32 of the second pivot joint 29 and a vertical longitudinal plane is preferably at least 45°, more preferably at least 70° and most preferably 90° as shown in FIG. 5. If the guide lever 25 is pivoted about the transverse rod 22, then the pivot joint 29 also buckles. The leaf spring 28 can thus maintain its orientation during the pivoting movement of the guide lever 25. The leaf spring 28 is merely raised upward slightly, on the circular path described by the guide lever 25 about the transverse rod 22.

A movement of the middle hoop 20 relative to the cable strand 21 in the longitudinal direction X is accordingly accommodated by a pivoting movement of the guide lever 25 about the transverse rod 22. A movement of the middle hoop 20 relative to the cable strand 21 in the transverse direction is accommodated by virtue of the roller 27 of the guide lever 25 running along the transverse rod 22. The cable guide is rigid with respect to other types of movements. The cable strand 21 is, by means of the guide lever 25, held with a defined spacing to the middle hoop 20 and in particular to the transverse rod 22. It is thus ensured that the cable strand 21 cannot strike the middle hoop 20. The orientation of the cable strand 21 in a longitudinal direction is also kept substantially constant by the guide lever 25.

What is claimed:

1. A middle hoop system for a vehicle joint arranged between a first vehicle section and a second vehicle section of a multi-unit vehicle, comprising a middle hoop (20), which is oriented in a transverse direction, and a cable strand (21) which extends between the first vehicle section (14) and the second vehicle section (15), the middle hoop (15) surrounding a passage (17) intended for passengers, and the cable strand (21) being arranged above the passage (17), characterized by a guide lever (25) which is connected to the middle hoop (20) by means of a first pivot joint (22/27) and which is connected to the cable strand (21) by means of a second pivot joint (29), an axis (31) of the first pivot joint (22/27) and an axis (32) of the second pivot joint (29) intersecting a vertical longitudinal plane.

2. The middle hoop system as claimed in claim 1, wherein the axis of the first pivot joint (22/27) encloses an angle of at least 45° with the vertical longitudinal plane.

3. The middle hoop system as claimed in claim 1, wherein the axis of the second pivot joint (29) encloses an angle of at least 45° with the vertical longitudinal plane.

4. The middle hoop system as claimed in claim 1, wherein the first pivot joint (22/27) is arranged above the second pivot joint (29).

5. The middle hoop system as claimed in claim 1, wherein a spacing (35) between the axis (31) of the first pivot joint (22/27) and the axis (32) of the second pivot joint (29) lies between 10 cm and 30 cm.

6. The middle hoop system as claimed in claim 1, wherein the second pivot joint (29) is fastened to a support device (28) of the cable strand (21), the support device (28) extending in a curved path along the cable strand (21).

7. The middle hoop system as claimed in claim 1, wherein a weight force exerted by the cable strand (21) acts in an elongation of the guide lever (25).

8. The middle hoop system as claimed in claim 1, wherein a linear guide is formed between the guide lever (25) and the middle hoop (20) or between the guide lever (25) and the cable strand (21).

9. The middle hoop system as claimed in claim 8, wherein the linear guide comprises a rod (22) which is connected to the middle hoop and on which the guide lever (25) is suspended.

10. The middle hoop system as claimed in claim 9, wherein the axis (31) of the first pivot joint (22/27) coincides with an axis of the rod (22).

11. The middle hoop system as claimed in claim 9, wherein, on the guide lever (25), there is formed a receptacle (26) which extends to both sides of the rod (22), and in that a roller (27) is mounted in the receptacle (26).

12. The middle hoop system as claimed in claim 1, characterized by a control rod (24) by means of which the middle hoop (20) is held with a fixed spacing or a fixed minimum spacing to the first vehicle section (14) or to the second vehicle section (15).

13. The middle hoop system as claimed in claim 1, wherein the axis of the first pivot joint (22/27) encloses an angle of 90° with the vertical longitudinal plane.

14. The middle hoop system as claimed in claim 1, wherein the axis of the second pivot joint (29) encloses an angle of 90° with the vertical longitudinal plane.

* * * * *